(No Model.)
W. I. COLLINS.
FERTILIZER DISTRIBUTER.
No. 329,020. Patented Oct. 27, 1885.
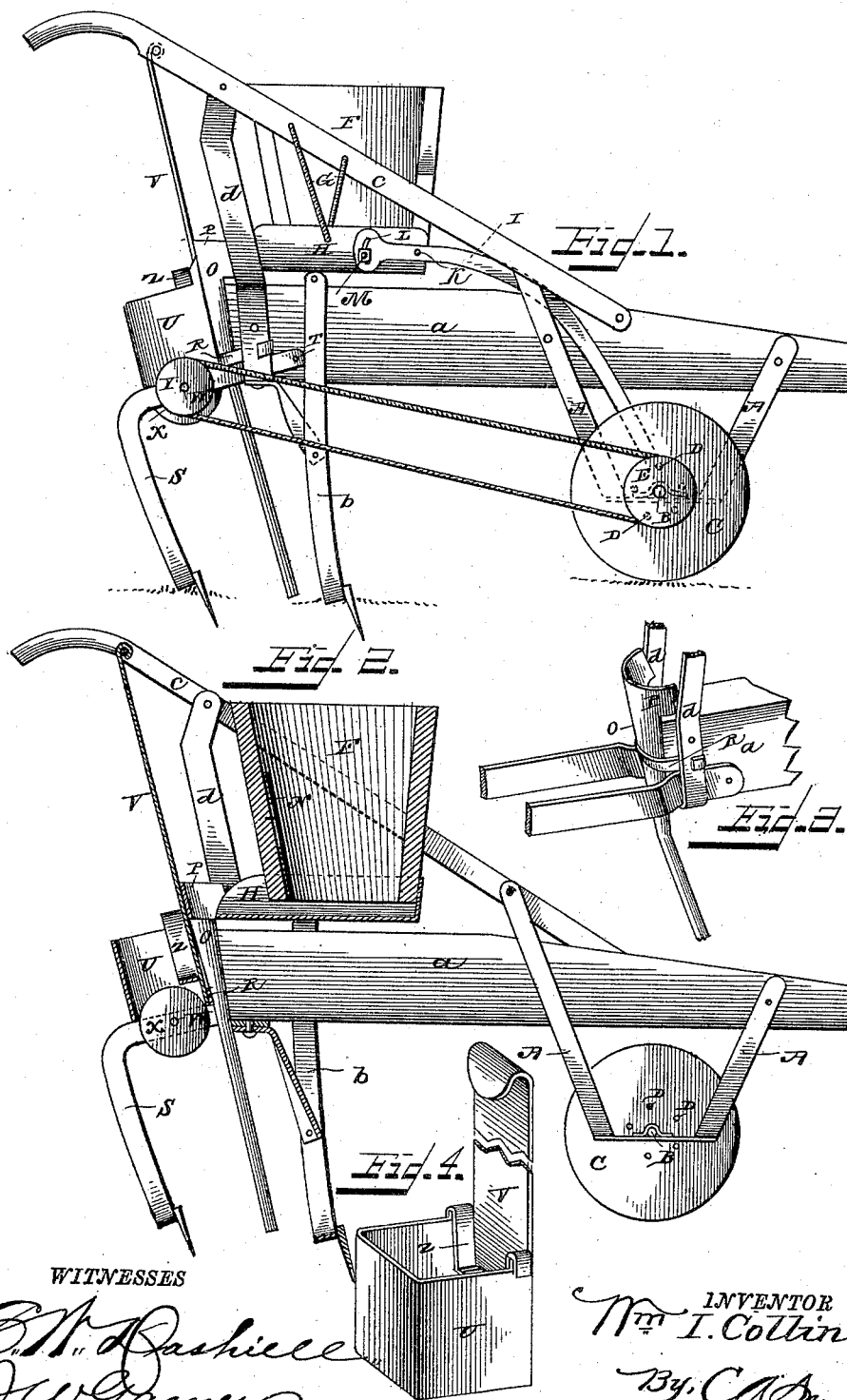
WITNESSES
INVENTOR
Wm I. Collins,
By C. A. Snow & Co.
Attorneys
N. PETERS, Photo-Lithographer, Washington, D. C.

UNITED STATES PATENT OFFICE.

WILLIAM IRBEN COLLINS, OF JACKSON, GEORGIA.

FERTILIZER-DISTRIBUTER.

SPECIFICATION forming part of Letters Patent No. 329,020, dated October 27, 1885.

Application filed May 27, 1885. Serial No. 166,841. (No model.)

*To all whom it may concern:*

Be it known that I, WILLIAM I. COLLINS, a citizen of the United States, residing at Jackson, in the county of Butts and State of Georgia, have invented a new and useful Improvement in Fertilizer-Distributers, of which the following is a specification, reference being had to the accompanying drawings.

My invention relates to an improvement in planters and fertilizer-distributers adapted to be attached to and readily detached from an ordinary plow; and it consists in the peculiar construction and combination of devices, that will be more fully set forth hereinafter, and particularly pointed out in the claims.

In the drawings, Figure 1 is a side elevation of a combined planter and fertilizer-distributer embodying my invention. Fig. 2 is a vertical central sectional view of the same. Figs. 3 and 4 are detail views.

This invention is adapted to be attached to an ordinary plow, of which $a$ is the beam, $b$ the standard, $c$ the handles, and $d$ are the braces therefor. The standard is attached near the rear end of the plow-beam in the ordinary way. To the front end of the plow-beam are bolted depending brackets A, in which is journaled a shaft, B, to which, between the brackets, is mounted a wheel, C, having tappet-pins D projecting from one side, and to one of the projecting ends of the shaft B is fixed a pulley, E.

F represents a bottomless hopper, which is preferably rectangular, and having inclined sides and ends, and is bolted between the plow-handles at a suitable distance above the top of the plow-beam.

Cords G depend from the handles, and to these cords are suspended a vibrating shaker, H, which is located below the hopper F. To one side of this shaker, at its front end, is fulcrumed a tappet-arm, I, as at K, which arm engages at its lower outer end with the tappet-pins on the wheel C, and thereby serves to agitate the shaker. In the rear end of the arm I is made a segmental slot, L, which is drawn from the center K, and through this slot passes a set-screw, M, that enters the side of the shaker. By this means it will be understood that the tappet-arm may be adjusted with relation to the shaker so as to increase or diminish the movement or throw of the shaker, and thereby regulate the quantity of the fertilizer that the shaker feeds from the hopper F. In the rear side of the hopper F is located a sliding plate, N, which may be raised or lowered therein, and which serves to regulate the quantity of fertilizer delivered onto the shaker.

It will be seen that the front end of the shaker is closed, and that its rear end, which extends slightly beyond the rear end of the plow-beam, forms the discharge end of the shaker.

O represents a delivery-spout, the lower end of which is formed into a tube, and is provided at its upper end with a funnel, P, the front side of which is open, and into which open side projects the rear end of the shaker. This spout is secured to the rear end of the plow-beam by means of a metallic strap, R, that passes around the spout, and has its front ends slipped between the braces $d$ of the plow-handles and the plow-beam, and then bent rearwardly thereon, as shown in Figs. 1 and 3.

S represents seed-coverers, which are secured to the rear end of the plow-beam by means of a transverse bolt, T, that passes through the front ends of their forwardly-extending arms, which arms also pass between the braces $d$ and the sides of the plow-beam.

U represents a seed-hopper, which is preferably constructed of sheet metal, is rectangular in shape, and is adapted to fit between the front arms of the seed-coverers immediately in rear of the spout O. The front side of this seed-hopper is provided with a vertical extension, V, the upper end of which is formed into a hook, that passes over the round or brace connecting the upper ends of the plow-handles, and thereby suspends the hopper therefrom.

A shaft, W, passes through the front arms of the seed-coverers, slightly below the lower edge of the sides of the seed-hopper, and to this shaft is fixed a seed disk or wheel, X, that works in the bottom of the hopper U, and to the outer end of said shaft is fixed a pulley, Y, that is connected by means of an endless belt or cord with the pulley E.

Z represents a U-shaped frame, which is formed from a piece of sheet metal, and has hooks bent upon its upper ends, which engage with the upper edges of the sides of the seed-hopper U, and suspend the frame in the front side thereof to one side of the seed-disk.

The function of this frame is to form substantially the segment of a bottom for the seed-hopper, and to prevent the seeds from being carried around by the seed-disk and choked and ground into the space between the front side of the rim of the seed-disk and the front side of the hopper.

It will be readily understood from the foregoing description that my improved devices can be easily taken from the plow when it is not desired to use them.

Having thus described my invention, I claim—

1. The combination, with the plow, of the actuating-wheel having the pulley E on its shaft, the hopper F, the vibrating shaker suspended below the hopper and extending beyond the plow-beam, the seed-spout for conveying the fertilizer from the shaker to the ground, the seed-coverers having arms extending beyond the rear end of the plow-beam, the shaft W, journaled in said arms and having the pulley Y, and the seed-disk and the hopper U, located between the arms of the seed-coverers, substantially as described.

2. The combination, with a fertilizer-distributer having rearwardly-extending seed-coverers, and ordinary plow-handles, of the hopper U, adapted to be located between the seed-coverers, and having a vertical extension, V, provided with a hook at its upper end, for suspending the hopper from the cross-bar of the handles, and a seed-disk working in said hopper, substantially as described.

3. The combination of the hopper U, the rotating seed-disk in its lower end, and the frame Z, having hooks whereby it is suspended from the sides of the hopper and bears between the front side thereof and the front side of the seed-disk, for the purpose set forth, substantially as described.

In testimony that I claim the foregoing as my own I have hereto affixed my signature in presence of two witnesses.

WILLIAM IRBEN COLLINS.

Witnesses:
 JOSEPH C. McCORD,
 LARKIN D. WATSON, Sr.